United States Patent [19]

Harris et al.

[11] 4,000,932
[45] Jan. 4, 1977

[54] TURBINE METER ROTOR BEARING

[75] Inventors: Lewis Karl Harris; Billy Steve Burrus; Donald Wayne Allison, all of Tulsa, Okla.

[73] Assignee: Combustion Engineering, Inc., Windsor, Conn.

[22] Filed: Sept. 15, 1975

[21] Appl. No.: 613,692

[52] U.S. Cl. ............................................. 308/237 R
[51] Int. Cl.$^2$ ............................................. F16C 9/00
[58] Field of Search ......... 308/194, 202, 26, 187.1, 308/237 R, 237 A, 238

[56] References Cited

UNITED STATES PATENTS 3,910,651 10/1975 Pearle et al. .................. 308/187.1

Primary Examiner—Philip Goodman
Assistant Examiner—Richard A. Bertsch
Attorney, Agent, or Firm—Arthur L. Wade

[57] ABSTRACT

The rotor of a turbine meter has a ceramic bushing and is mounted on a ceramic shaft. A ceramic body is mounted to engage the bushing in one direction. Thin layers of elastomeric material are placed between the mounted end of the shaft and the ceramic body and its mount to provide mechanical shock absorption.

3 Claims, 1 Drawing Figure

U.S. Patent  Jan. 4, 1977  4,000,932
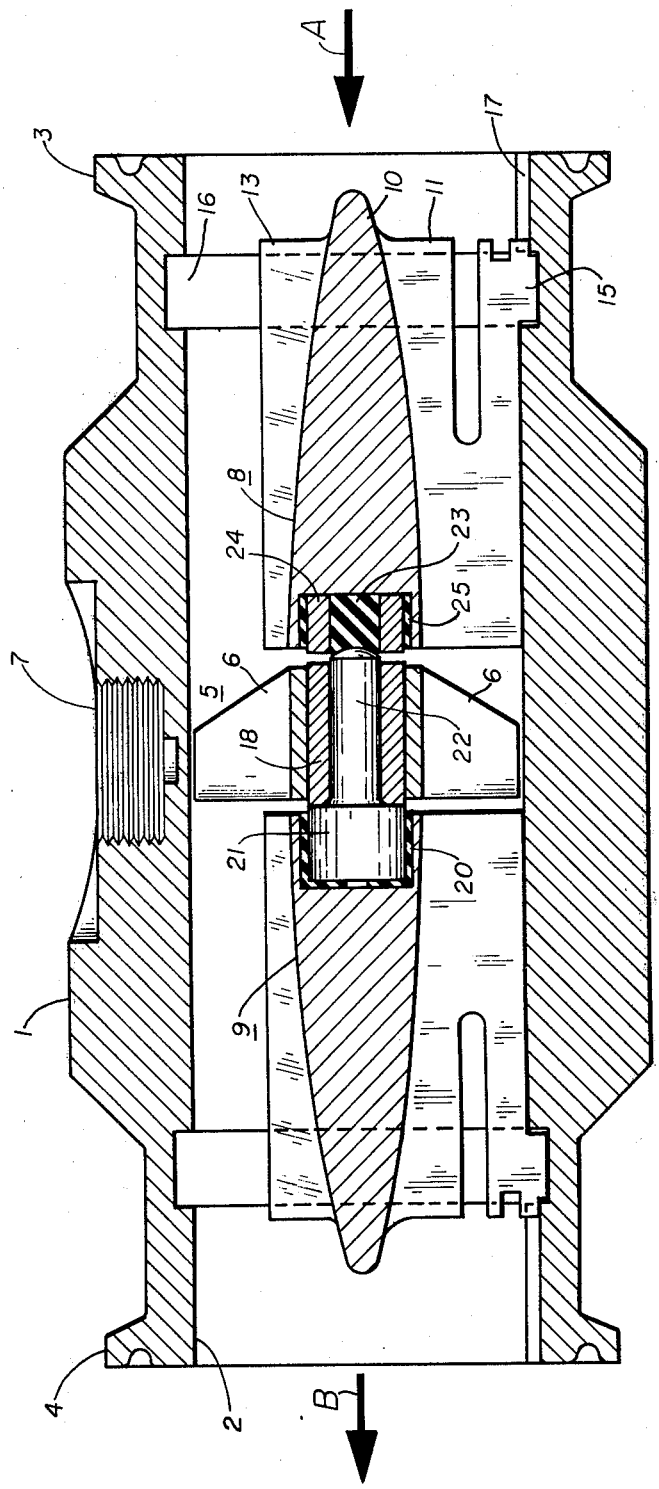

TURBINE METER ROTOR BEARING

BACKGROUND OF THE INVENTION

1. Field of the Invention

The present invention relates to bearings for the rotors of turbine meters. More specifically, this invention relates to a bearing in the form of a bushing within the rotor through which a supporting, cantilever shaft extends as a mount for the rotor. Even more specifically, the invention relates to the material of the bushing and shaft and material between the shaft and its spider support which provides a cushion against mechanical shock forces which are applied to the rotor.

2. Description of the Prior Art

There has always been, and will always be, pressure for improvements to the bearings of turbine meter rotors. One, there is the overhanging need for a bearing which will provide for flow reversals. Lubrication will never be completely satisfactory. Now the sanitary market requires more simplicity to reduce retention of food in which harmful bacteria will develop. All configurations of turbine meter structure are being redesigned to get the simple form which will not harbor collections of food-fluids metered or which can be readily flushed clean of this residue.

The food industry is active in establishing standards for meter structures which must be brought into direct contact with food. No turbine meter design has been given a universal stamp of approval. This art has the problem of providing the meter function with structure which is simple enough to meet the evolving sanitary standards of industry as they apply to measurement.

SUMMARY OF THE INVENTION

It is an object of the present invention to provide a bearing structure for the rotor of turbine meter which will function effectively in both directions of flow through the meter.

Another object is to mount the rotor on a cantilever shaft with elastomeric material placed to absorb mechanical forces on the rotor and shaft.

The present invention contemplates a turbine meter with a housing bored to receive spider structure support of a rotor. The rotor bears upon the shaft with a ceramic insert positioned centrally. The ceramic bearing insert is journalled over a shaft of ceramic material, the shaft mounted by its downstream end to the downstream spider and cushioned in the mounting by elastomeric material. The upstream spider mounts an elastomeric body which engages the upstream end of the shaft and a ceramic body which is aligned to engage the ceramic bearing insert of the rotor upon reverse flow of fluid through the meter.

Other objects, advantages and features of this invention will become apparent to one skilled in the art upon consideration of the written specification, appended claims, and attached drawings, wherein;

The drawing is a sectioned elevation in perspective of a turbine meter body with a rotor bearing including the present invention.

DESCRIPTION OF THE PREFERRED EMBODIMENT

Referring to the drawing, there is disclosed a flanged body of a turbine meter. Body 1 has a central bore 2 through which fluids to be metered are flowed. Arrow A indicates the direction of fluid flow into the bore 2 and arrow B indicates the flow out of the bore. Flanges 3, 4 represent one means with which the body 1 can be included in a conduit and respond to the fluid as it flows therethrough.

The primary element of the meter which responds to the fluid flow is rotor 5. It is basically the object of the invention to support rotor 5 on a bearing within bore 2 so it will rotate in response to the fluid flow. The rotor vanes 6 each cut magnetic lines of force sustained by a pickup element mounted in receptacle 7. The rate at which the lines of force are cut becomes a measure of the fluid flow rate through bore 2.

Rotor 5 is a shell-like housing to which rotor vanes 6 are attached on its external surface. The specific bearing and shaft support for rotor-housing 5 embodies the concepts of the present invention.

Spiders 8 and 9 each comprise a central, elongated body and vanes radiating outward to engage the walls of bore 2. Refer to upstream spider 8. Body 10 may be cast with vanes 11, 12 (not shown), 13 as an extended part of the body. There could be more, but usually three vanes are adequate for the required stability for rotor 5.

Having cleared the preliminaries and given the proper setting, the present invention can now be hopefully disclosed with simplicity and clarity. The structure embodying the invention is in the bearing for rotor 5.

It is evident that all three vanes 11, 12 and 13 of spider 8 extend to the wall of bore 2. Vane 11 has a structure extension which engages a groove system in the bore wall. Specifically, extension 15 on vane 11 fits down into both circumferential groove 16 and longitudinal groove 17. This extension and groove engagement effectively fixes the vane 11 and its entire spider 8 at the desired location for support of the bearing for rotor 5.

The stark simplicity of the grooves and vane extension militate against the dreaded collection of food material in which bacteria develops to contaminate. Also, the same simplicity of structure for the rotor bearing keeps it clean or readily flushed of food passing through bore 2. Compared with the complexity of prior art bearing structures, the present bearing structure disclosed is readily cleaned and has a minimal "catching" function. The arrangement gives a stable, rugged, dependable bearing for rotor 5. At the same time the structure meets the developing standards for a "sanitary" turbine meter. At this point in time no other known, commercially available, turbine meter structure is accepted by the food industry for the service of metering food fluids. A significant breakthrough has been made in this particular art.

As stated, and indicated supra, there are many forms of bearings and bearing supports, in the prior art. Some bear superficial comparison to the embodiment of this invention. However, there are marked differences which amount to a significant advance in the art.

First, it has been established that cobalt binder in tungsten carbide is readily leached by lactic acid of food fluids. Through systematic engineering procedure, reduction of the binder was considered to meet the acid attack on bearings of tungsten carbide. However, it was discovered that ceramics have inherently better bearing characteristics than tungsten carbide. The ceramics also use a binder, but this binder can also be reduced. Thus, ceramic was selected as the more satisfactory bearing material for rotor 5.

The next conception of a cantilever type journal bearing, with bushing 18 in the rotor, proved easier to clean. Holes in the spider support were eliminated. Mechanical alignment problems were reduced. Improvement was obtained in linearity of response.

Unfortunately, the ceramic shaft and bushing 18 failed in reverse flow. It is virtually certain that the failure was due to either mechanical shock or cyclic stress imparted by vibration of the rotor. So, ceramic material is brittle i.e., the yield strength approaches or equals the tensile strength. Brittleness cannot usually be reduced by increasing the tensile strength because this carries the yield strength and the brittleness upward as well. Therefore, some cushioning means for the ceramic structure from mechanical stress was needed.

Embodiment of the cushioning concept, in this particular type of bearing structure, is in the thin film of Viton 20, as elastomeric materials between the downstream spider support 9 and the base 21 of cantilever shaft 22. Also a food-grade Buna N could be a satisfactory elastomeric material for this structure. Additional stability was given the shaft 22 by a Viton body 23 mounted in upstream spider support 8.

To provide a bearing surface in support 8 for rotor bushing 18, a ceramic torus 24 was mounted axially in support 8. This torus 24 mounted the Viton body 23 in its center and is, in turn, provided with the thin film of Viton 25 between it and support 8. Thus both the ceramic torus and shaft 22 are cushioned from mechanical shock while providing complete bearing engagement with rotor bushing 18 in both directions of flow.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A bearing for the rotor of a turbine meter, including,
  a bushing of ceramic material mounted axially in the rotor,
  a shaft of ceramic material mounted in one of the two spider supports so as to extend axially of the bore of the turbine meter body and through the rotor bushing, and
  a body of ceramic mounted in the second of the spider supports and positioned to provide bearing engagement with rotor bushing at one end of the bushing.

2. The bearing of claim 1 including,
  a body of elastomeric material positioned between the end of the ceramic shaft and its spider support, and
  a body of elastomeric material positioned between the ceramic body and its spider support.

3. The bearing of claim 2 in which, the body of ceramic material is in the form of a torus and is positioned in axial alignment with the ceramic shaft, and
  a body of elastomeric material is mounted within the central cavity of the ceramic torus and positioned to engage the free end of the ceramic shaft as it extends from its spider support.

* * * * *